United States Patent [19]
DiCroce

[11] Patent Number: 6,040,636
[45] Date of Patent: Mar. 21, 2000

[54] SYSTEM CONTROLLING VEHICLE WARM UP OPERATION RESPONSIVE TO ENVIRONMENT CO LEVEL

[75] Inventor: John R. DiCroce, Oceanside, N.Y.

[73] Assignee: Audiovox Corporation, Hauppauge, N.Y.

[21] Appl. No.: 08/969,681

[22] Filed: Nov. 13, 1997

[51] Int. Cl.[7] .................................................. F02N 17/00
[52] U.S. Cl. ...................................... 307/10.1; 123/179.4
[58] Field of Search .................................... 307/9.1, 10.1, 307/10.6, 38, 39, 118, 141, 141.4, 141.8; 340/632, 521, 825.69, 825.72; 49/25, 31; 123/179.1, 179.2, 179.3, 179.4, 198 DC; 180/287; 73/23.2, 31.02; 290/38 R, 38 C, 37 R

[56] References Cited

U.S. PATENT DOCUMENTS

| | | |
|---|---|---|
| 3,780,311 | 12/1973 | Brown . |
| 4,056,932 | 11/1977 | Nakamura et al. . |
| 4,089,307 | 5/1978 | Nakamura . |
| 4,197,675 | 4/1980 | Kelly ............................................ 49/31 |
| 4,221,206 | 9/1980 | Haas ................................. 123/198 DC |
| 4,304,070 | 12/1981 | Musacchia .................................... 49/31 |
| 4,365,250 | 12/1982 | Matsuoka et al. ................. 340/825.32 |
| 4,464,651 | 8/1984 | Duhame ............................. 340/825.69 |
| 4,808,995 | 2/1989 | Clark et al. ....................... 340/825.69 |
| 4,819,551 | 4/1989 | Vole ............................................ 49/31 |
| 4,893,113 | 1/1990 | Park et al. . |
| 4,928,778 | 5/1990 | Tin .......................................... 180/167 |
| 4,968,978 | 11/1990 | Stolarczyk . |
| 5,199,397 | 4/1993 | Shelef et al. ....................... 123/198 D |
| 5,205,253 | 4/1993 | Shelef et al. . |
| 5,276,434 | 1/1994 | Brooks et al. ........................... 340/632 |
| 5,333,703 | 8/1994 | James et al. ............................ 340/438 |
| 5,341,643 | 8/1994 | Hamburg et al. . |
| 5,461,365 | 10/1995 | Schlager et al. . |
| 5,576,739 | 11/1996 | Murphy ............................. 340/825.06 |

*Primary Examiner*—Richard T. Elms
*Attorney, Agent, or Firm*—Morrison Law Firm

[57] ABSTRACT

A system for controlling engine operation responsive to engine emitted CO presence in a closed space includes a CO sensor carried in a control unit in the vehicle or in the space. Other control units can be used and are associated with a space closure door and a space fan unit. When the sensor unit detects an unacceptable CO level in the space signals including discrete RF signals are generated to effect engine shutdown and to open a space closure door as well as operate a space ventilation fan until a safe CO level in the space is produced at which point second signals are generated to shut the closure door, turn off the ventilation fan and optionally re-enable engine operation.

7 Claims, 4 Drawing Sheets

SYSTEM CONTROLLING VEHICLE WARM UP OPERATION RESPONSIVE TO ENVIRONMENT CO LEVEL

BACKGROUND OF THE INVENTION

It is known for a person to start a motor vehicle from a remote location. This can be done by person as a preliminary convenience just prior to the person's using the vehicle and starting can be initiated with a hand held signal transmitter, the signal transmitted, e.g., causing operation of the vehicle starter circuitry to crank and establish idling run of the engine.

Remote starting also is practiced to advantage in regions of extreme cold climate where low temperatures exist for long periods of time and a vehicle engine has to be warm enough to insure immediate start when needed. Prior to provisions of devices for automatically enabling remote start in cold climate locations responsive to a particular temperature, a person would have to manually activate a remote control unit to warm the vehicle engine, e.g., every two hours. This is of great inconvenience where the person had to awaken a number of times during the night to activate the control.

In lieu of low temperature start routines, a timed automatic start sequence can be used to allow engine starting at pre selected intervals of two or four hours over a certain time lapse, e.g., a 48 hour period.

Where frequent engine start routines are practiced it can raise a problem with regard to CO (carbon monoxide) presence in the environment where the vehicle is located. CO gas is colorless, odorless and tasteless thereby making its presence difficult to detect.

In cold climate settings, a vehicle equipped with a remote start system may be housed in a closed space such as a garage wherein ventilation can be nil and buildup of CO concentration to dangerous level can occur very quickly.

If a person parks a vehicle in the garage and inadvertently sets the automatic start timer or a low temperature timer, the possibility exists for a toxic level buildup of CO fumes from engine running. This can be especially dangerous for homes with attached garages as penetration of CO gas into the living spaces can take place exposing the residents to headache, nausea, vomiting or even death.

It is desirable therefore, that a system be provided which functions not only to detect and/or monitor CO presence in a space but also to initiate measures to reduce CO level to one below a hazardous to humans level.

OBJECTS AND SUMMARY OF THE INVENTION

Accordingly, it is an object of the invention to provide a system for controlling vehicle engine warmup operation which overcomes the drawbacks of the prior art.

Another object is to provide a system for disabling a vehicle engine operating circuit when an undesirable level of CO presence is detected in the space where the engine is located.

A further object is to provide a system for detecting undesirable levels of CO in a space wherein with such detection, there is initiated procedures to rid the space of the CO presence and return it to human safe condition.

Another object is to provide a CO presence detection device which is readily integrated with remotely controlled vehicle operating systems.

Briefly stated there is provided a system for controlling engine operation responsive to engine emitted CO presence in a closed space. The system includes a CO sensor carried in a control unit in the vehicle or in the space. Other control units can be used and are associated with a space closure door and a space fan unit. When the sensor unit detects an unacceptable CO level in the space, signals including discrete RF signals are generated. These signals can be used to effect engine shutdown, to open a space closure door and to operate a space ventilation fan. When a safe CO level in the space is produced, second signals are generated to shut the closure door, turn off the ventilation fan and optionally re-enable engine operation.

In accordance with the invention there is provided a system for controlling vehicle engine operation responsive to engine emitted CO presence in a closed space wherein the engine is operated and for controlling ventilation of the space to reduce a level of the CO therein. The system comprises a device connected with the engine having an engine shutdown mode operable on receipt thereby of a shutdown signal to shutdown the engine when the engine is operating. A control unit is provided and is operable on an initiation thereof, to output at least a first discrete RF signal. A CO sensor unit for sensing a presence of CO the CO sensor unit outputs a distinct signal when a sensed CO value is above an acceptable level, said CO sensor being effective to initiate operation of said control unit. One of said distinct signal and said at least a first discrete RF signals constitutes the engine shutdown signal, a other of said distinct and said at least a first discrete RF signals being employed to start a space ventilation operation.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT(S)

The system of the invention is intended for use in a home or commercial garage, a repair facility or the like wherein motor vehicle engine operation in a closed space results in CO emission which can build up to an unacceptable harmful to humans level.

The system allows that remediation of the unacceptable CO condition in the closed space be dealt with by effecting engine cause shutdown and/or initiating ventilation of the space.

Figure 4:
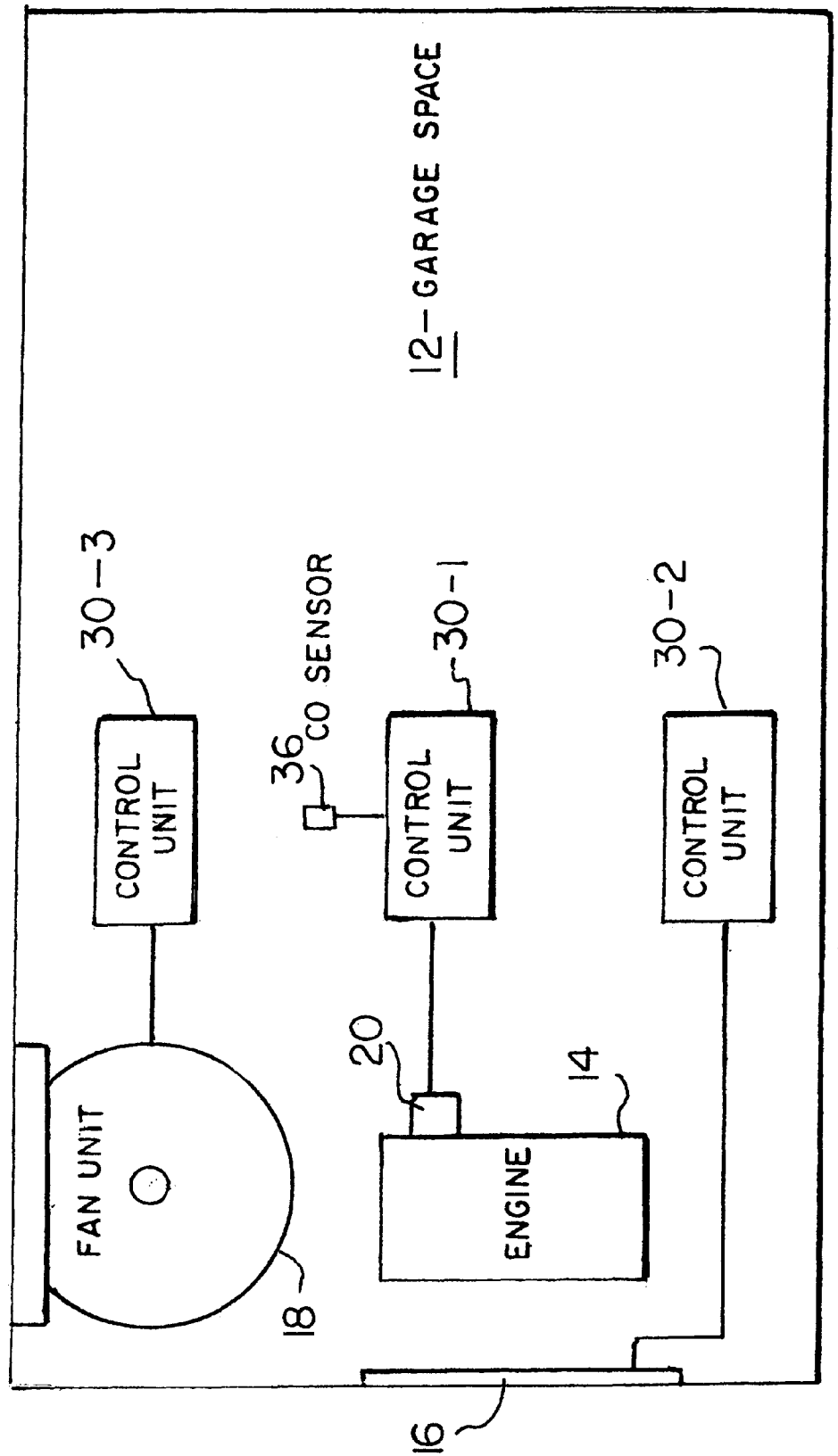
FIG. 4 is a diagrammatic showing of the system as embodied in a closed space wherein a vehicle is located and when operated therein emits CO that can build up to harmful unacceptable levels.

Referring to FIG. 4, there is depicted a space 12 such as a garage part of a residence. Within the space 12 is a vehicle having an engine 14 that can be operated as in a cold weather warmup operation at times when residents are retired for the night. The garage space can include a power operated garage door 16 separating the space from an outside air environment as well as a fan unit 18 which can be operated to exhaust air from the garage and replace it with fresh outside air.

The hereinafter described system 10 uses a sensor unit to sense a CO condition in the space. This sensor unit is used in conjunction with control units associated with an engine startup module 20 in the vehicle, the garage door 16 and the fan unit 18 to effect engine shutdown, opening of the garage door and operation of the fan unit upon advent of buildup of an unacceptable CO level in the garage due to engine operation in the garage space. More specific details of the system follow.

Figure 1:
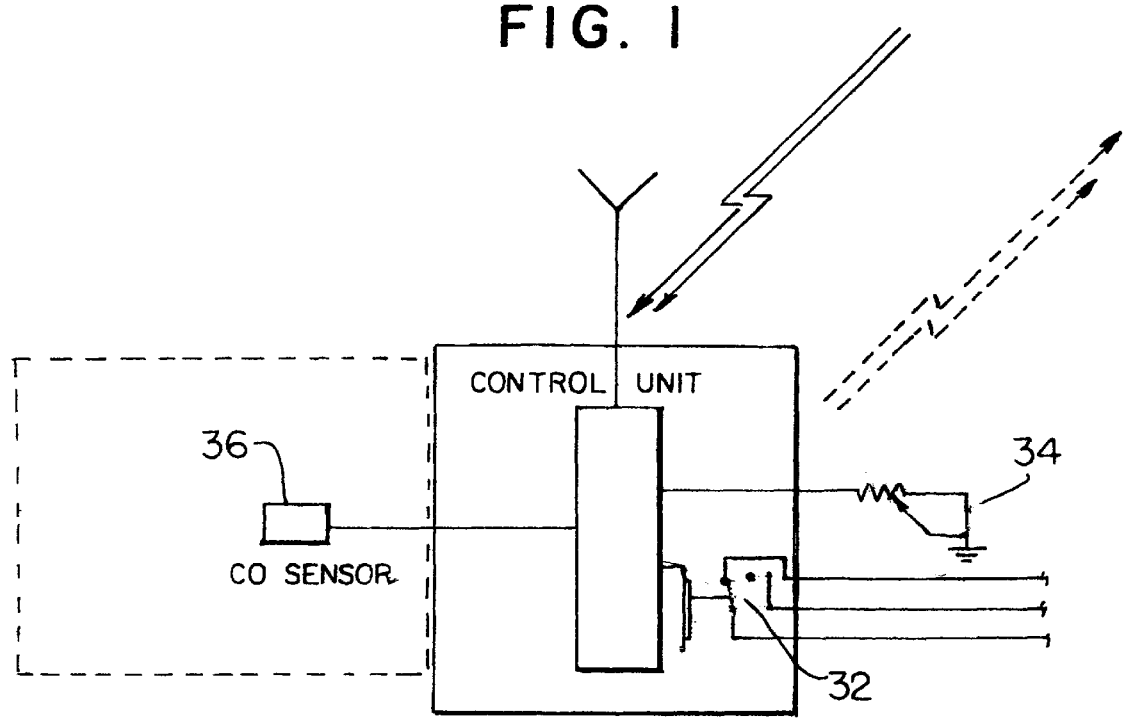
FIG. 1 is a schematic showing of a transceiver control unit type employed in the system of the invention.

Referring to FIG. 1, there is depicted a control unit which is a transceiver, i.e., it is a receiver/transmitter. In further description and as will be seen from FIGS. 2 and 3, three control units 30-1, 30-2 and 30-3 are used in system 10, these being associated one each with one of three system functions of engine shutdown, space door opening/closing and fan unit operation all as will be described later. Each of these control units is capable of both receiving and transmitting discrete RF signals. Each control unit is provided with control relays having contacts shown generally at 32, the contacts being connected as by hard wiring to a function location. Each control unit also is provide with a user adjustable variable resistor timer control 34 for purposes as will appear later.

Figure 2:
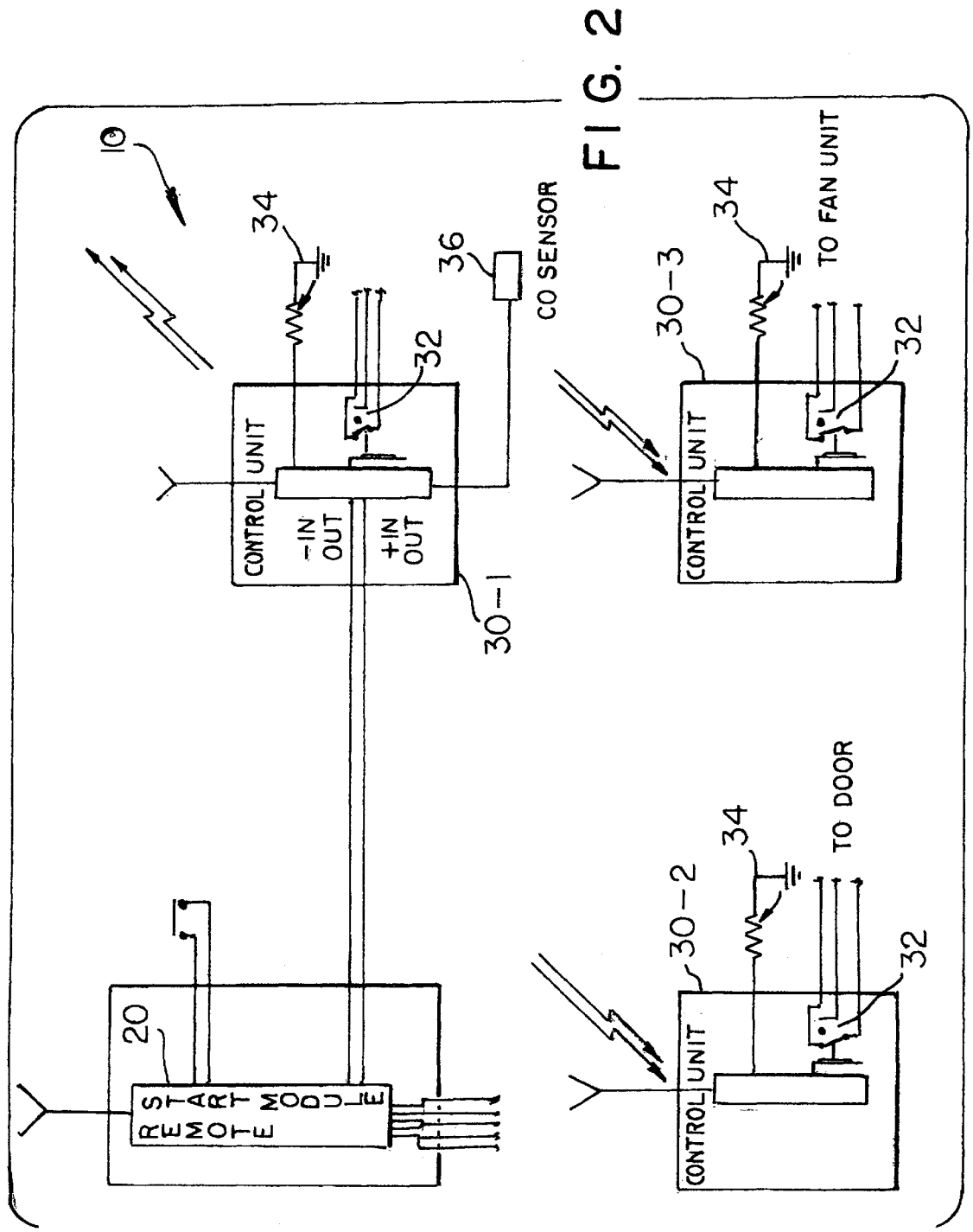
FIG. 2 is a schematic depiction of the system wherein the CO sensor is embodied in a vehicle and used with a remote start device.

Referring now to FIG. 2, in this system embodiment, control unit 30-1 is directly connected to remote start module 20 and includes a CO sensor unit 36. Illustrative of the sensor type is MGS 1100 Carbon Monoxide Gas Sensor manufactured and sold under license from MOTOROLA. With the sensor unit 36 connected to control unit 30-1, the control unit can transmit signals indicative of high (unacceptable) and low (acceptable) CO levels. When the sensor unit 36 senses an unacceptable CO level, it outputs a distinct signal serving as an engine shutdown signal. The signal is directly communicated via the illustrated high level positive or negative connections to the remote start module 20 resulting in engine shutdown or if the engine already be shutdown, the distinct signal can serve to disable a restart of the engine.

Using the control relay contacts of the control unit 30-1 during the time of shutdown, a first discrete RF signal is transmitted by the control unit. This signal is received by control units 30-2 and 30-3 thereby causing these to provide momentary contact closure in their relays of the contacts 32 which in turn initiates the start sequence for respective door 16 and fan unit 18 hard wired to the relay.

The timer control 34 of control unit 30-2 is preset to control a second momentary contact closure once the timer setting expires. The timer can be set to run only a few seconds. This is done because the first discrete RF signal starts the door in open movement. As it is convenient and effective for the intended purpose that the door not be fully opened, the second contact closure caused by timer rundown will stop the opening travel of the door.

The timer 34 in control unit 30-3 will be set for a longer rundown period to allow sufficient fan unit operation to clear the space 12 with fresh outside air. The timer, e.g., could bet set for a one hour rundown. On rundown of its timer 34, the fan will shutdown as the timer effects momentary contact closure.

When the CO level in the space reduces to an acceptable level, the sensor unit 36 will sense same and such causes the control unit to transmit a second discrete RF signal, this second RF signal being a different data word than the first RF signal. The second discrete RF signal will be received by control units 30-2 and 30-3 and cause momentary contact closure of the relays in each. This closure of the contacts causing the door 16 to move in the closing direction. The second RF signal to the control unit 30-3 if received while the fan is running, stops the fan unit. If the timer 34 of control unit 30-3 has already expired so the fan is stopped, the second RF signal received by control unit 30-3 serves to reset the timer of control unit 30-2. The second RF signal received by control unit 30-2 is redundant since the short timer cycle of its associated timer 34 would have reset itself before the second RF signal was transmitted.

Figure 3:
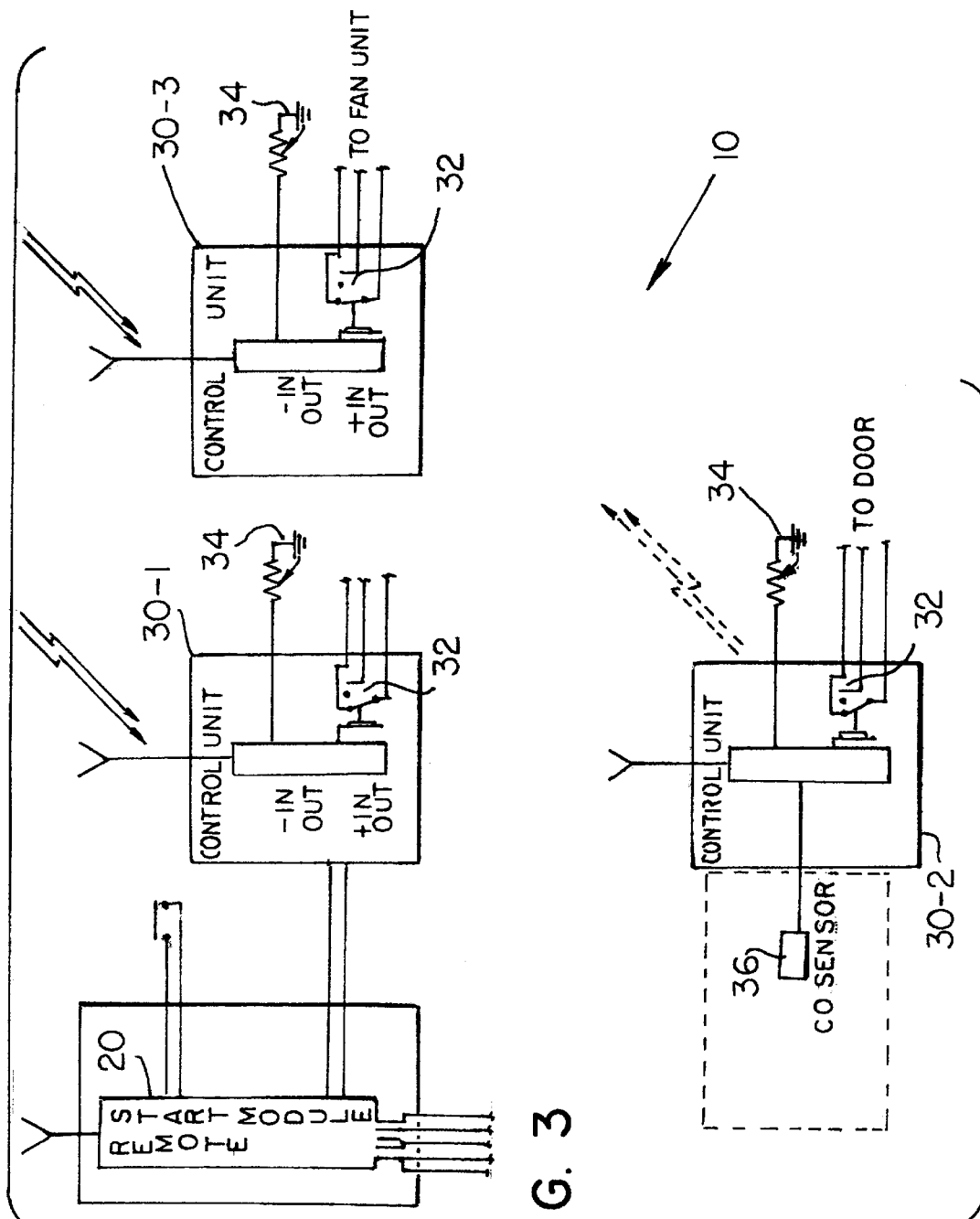
FIG. 3 is the same as FIG. 2 except the CO sensor is mounted at a location in a garage.

The system embodiment shown in FIG. 3 differs from that of FIG. 2 in that the sensor unit 36 is carried in control unit 30-2. When the sensor unit senses unacceptable CO level, the control unit 30-2 directly signals with a distinct signal via its relay, the garage door to open and it also transmits a first discrete RF signal. After a few seconds of door opening, the timer 34 in control unit 30-2 expires and momentarily causes the relay contacts to close and door opening travel to cease, the door stopping at partly open position.

The first discrete RF signal transmitted by control unit 30-2 is received by both of control units 30-1 and 30-3. This results in the fan unit 18 starting, the fan later being shut down by the timer in control unit 30-3. When the CO level is later sensed to be at acceptable level, the control unit 30-2 will transmit a second discrete RF signal which is received by control units 30-1 and 30-3. This will cause the fan unit 18 to stop and if the associated timer 34 is not yet rundown, the RF signal will reset the timer. If the timer previously had rundown so that the fan is stopped, the second RF signal received by control unit 30-3 is a mere redundancy without effect. Control unit 30-2 also functions when acceptable CO level is sensed to transmit a distinct signal via its relay to effect closing of the garage door.

The first discrete RF signal received by the control unit 30-1 will cause a shutdown signal to be directed to the remote start module. In this situation, the timer 34 in control unit 30-1 can be set to the off or minimum setting as no additional stop activation is required.

It will be appreciated that a control unit such as the FIG. 3 control unit 30-3 can be used alone in a space such as a boiler room where exhaust of the space is the only requirement. Operation of same to sense unacceptable and acceptable CO levels and to provide therefrom the signalling to a fan unit for fan unit start and shutdown would be as already given described in respect of the FIG. 3 fan unit.

It will be understood further that a sensor fitted control unit carried in a vehicle could be used to monitor and correct unacceptable CO level presence in an occupied vehicle. For example the correction function could be the automatic opening of the vehicle window(s).

As used herein, an acceptable CO level is considered one to be a level of CO, e.g., below 5 per cent or less than 50 ppm at 8 hours as per OSHA indicated safe level.

Having described preferred embodiments of the invention with reference to the accompanying drawings, it is to be understood that the invention is not limited to those embodiments, and that various changes and modifications may be effected therein by one skilled in the art without departing from the scope or spirit of the invention as defined in the appended claims.

What is claimed is:

1. System for controlling vehicle engine operation responsive to engine emitted CO presence in a closed space wherein the engine is operated and for controlling ventilation of the space to reduce a level of the CO therein, said system comprising a device connected with the engine having an engine shutdown mode operable on receipt thereby of a shutdown signal to shutdown the engine when the engine is operating, a first control unit operable on an initiation thereof to output at least a first discrete RF signal, a second control unit, a CO sensor unit for sensing a presence of CO, the CO sensor unit outputting a distinct signal when a sensed CO value is above an acceptable level, said CO sensor being effective to initiate operation of said first control unit, one of said distinct signal and said at least a first discrete RF signal constituting the engine shutdown signal, an other of said distinct and said at least a first discrete RF signals being received by the second control unit for enabling a start of a space ventilation operation which includes the opening of a closure member separating a communication of the closed space with an outside air environment, and the operation of a fan unit for exchanging CO containing air from within the closed space with air from the outside air environment, the second control unit being associated with the opening of said closure member, the system including a third control unit associated with said fan unit, said at least a first RF signal being received by said third control unit for enabling start of said fan unit, the respective ones of the second and third control units controlling the closure member and fan unit, respectively, with a circuit connection thereto which includes control relays in the control units, receipt of the said other of said distinct and said at least a first of said discrete RF signals by said second control unit and receipt of said at least a first discrete RF signal by said third control unit being effective to provide momentary relay contact closure to start opening the closure member and turn on the fan unit.

2. The system of claim 1 in which the second and third control units each include a timer unit operable at expiration of predetermined time periods to cause momentary relay contact closure effective to stop closure member opening and turn off the fan unit.

3. The system of claim 2 which on the CO sensor unit sensing a presence of an acceptable value of CO in the closed space it is effective to output a further distinct signal and to initiate operation of the first mentioned control unit to output a second discrete RF signal, one of said further distinct signal and said second discrete RF signal being employed to effect momentary relay contact closure to start closing of the closure member, a second discrete RF signal received by said third control unit being effective to provide momentary relay contact closure to effect fan unit turn off if said fan unit is running.

4. System for controlling vehicle engine operation responsive to engine emitted CO presence in a closed space wherein the engine is operated and for controlling ventilation of the space to reduce a level of the CO therein, there being a closure member separating the closed space from an outside air environment and a fan unit operable for exchanging CO containing air from within the closed space with air from the outside air environment, said system comprising a device connected with the engine having an engine shutdown mode operable on receipt thereby of a shutdown signal to shutdown the engine when the engine is operating, a control unit operable on an initiation thereof to output at least a first discrete RF signal, a CO sensor unit for sensing a presence of CO, the CO sensor unit being connected with the control unit and operable to output a distinct signal when a sensed CO value is above an acceptable level, and a second control unit for controlling an opening and closing of said closure member, one of said distinct signal and said at least a first discrete RF signal constituting the engine shutdown signal, an other of said distinct and said at least a first discrete RF signals being effective for operating said second control unit to start an opening of the closure member, said second control unit including means to stop closure member opening a selected distance before a full open position thereof.

5. The system of claim 4 comprising a third control unit for controlling an operation of said fan unit, a said one of said distinct signal and said at least a first discrete RF signal being effective for operating said third control unit to start an operation of said fan unit, said third control unit including means to stop fan unit operation after a selected time of operation.

6. The system of claim 5 in which the CO sensor is operable to sense a CO value at or below an acceptable level and cause the control unit to transmit a second discrete RF signal, said second discrete RF signal being effective for operating said second control unit to start a closing of the closure member, said second discrete RF signal being effective further to shut down said fan unit if said fan unit is operating.

7. The system of claim 4 in which the engine shutdown device is such that if the engine is at shutdown mode when the shutdown signal is received thereby, such signal is effective to disable a restart of the engine.

* * * * *